United States Patent
Laib et al.

(10) Patent No.: US 11,285,542 B2
(45) Date of Patent: Mar. 29, 2022

(54) DEVICES AND METHODS FOR UNPACKING AN OBJECT MANUFACTURED BY LAYERED APPLICATION

(71) Applicant: TRUMPF Laser- und Systemtechnik GmbH, Ditzingen (DE)

(72) Inventors: Wolfgang Laib, Besigheim (DE); Andreas Margolf, Korntal-Muenchingen (DE); Ben Haugk, Stuttgart (DE); Christopher Mimra, Isny (DE); Daniel Giek, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 322 days.

(21) Appl. No.: 16/599,618

(22) Filed: Oct. 11, 2019

(65) Prior Publication Data

US 2020/0038960 A1 Feb. 6, 2020

Related U.S. Application Data

(63) Continuation of application No. PCT/EP2018/056075, filed on Mar. 12, 2018.

(30) Foreign Application Priority Data

Apr. 13, 2017 (DE) .......................... 102017108080.5

(51) Int. Cl.
*B23B 1/00* (2006.01)
*B33Y 40/00* (2020.01)
(Continued)

(52) U.S. Cl.
CPC ................ *B23B 1/00* (2013.01); *B33Y 40/00* (2014.12); *B22F 10/10* (2021.01); *B22F 12/00* (2021.01)

(58) Field of Classification Search
None
See application file for complete search history.

(56) References Cited

U.S. PATENT DOCUMENTS

2007/0001342 A1* 1/2007 Oberhofer .............. B33Y 10/00 264/237
2016/0279871 A1* 9/2016 Heugel .................... B08B 7/02

FOREIGN PATENT DOCUMENTS

DE 102007014968 10/2008
DE 202013009787 12/2013
(Continued)

OTHER PUBLICATIONS

PCT International Search Report and Written Opinion in International Appln. No. PCT/EP2018/056075, dated Jun. 15, 2018, 18 pages (with English translation).

(Continued)

*Primary Examiner* — Nathan T Leong
(74) *Attorney, Agent, or Firm* — Fish & Richardson P.C.

(57) ABSTRACT

Described are devices and methods for unpacking a three-dimensional object, manufactured in a swap container by layer-by-layer application and selective solidification of a powdery structural material, from the structural material that surrounds the object and has remained unsolidified, comprising a turning device that rotates the swap container from an upright position into an unloading position for discharging the unsolidified structural material, wherein the turning device comprises a drive unit by which the three-dimensional object is displaceable into a removal position relative to the swap container), following the unpacking of the unsolidified structural material.

14 Claims, 4 Drawing Sheets

(51) Int. Cl.
*B22F 12/00* (2021.01)
*B22F 10/10* (2021.01)

(56) References Cited

FOREIGN PATENT DOCUMENTS

| DE | 102013223407 | 5/2015 |
|----|--------------|--------|
| DE | 202016003042 | 7/2016 |
| EP | 3167984 | 5/2017 |
| WO | WO 2017/017273 | 2/2017 |
| WO | WO 2018/188867 | 10/2018 |

OTHER PUBLICATIONS

PCT International Preliminary Report on Patentability in International Appln. No. PCT/EP2018/056075, dated Oct. 24, 2019, 9 pages.

* cited by examiner

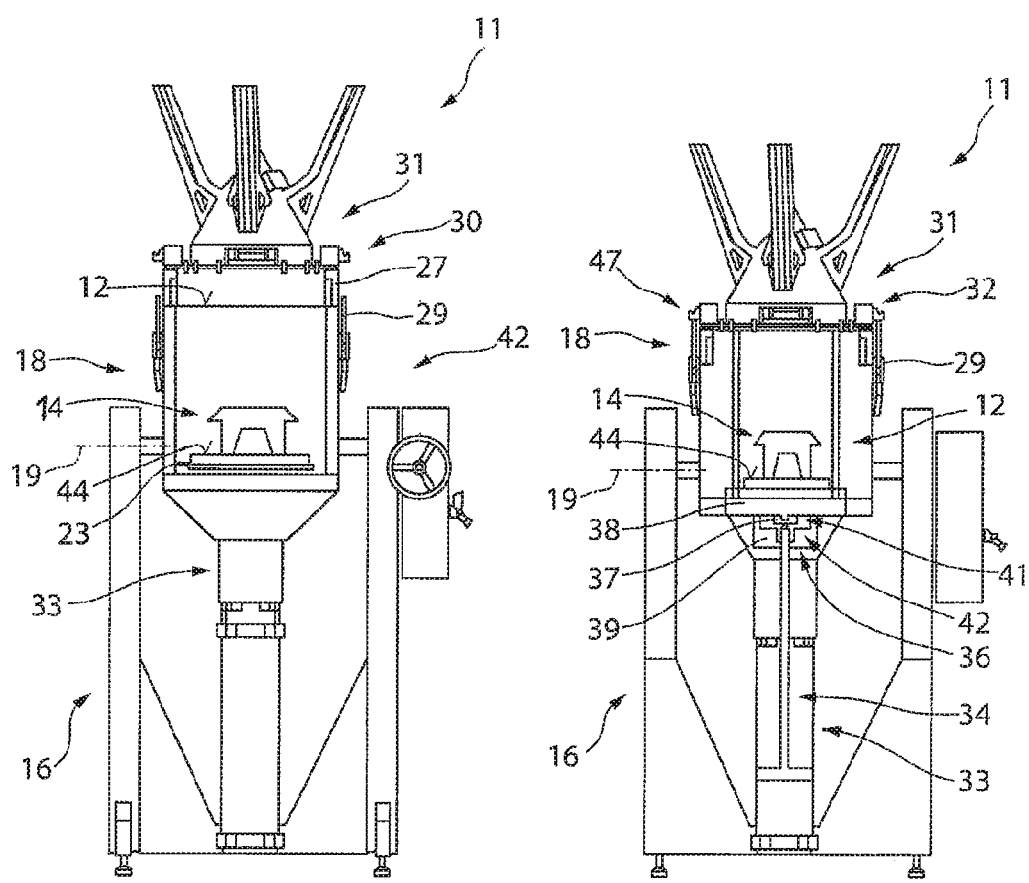

DEVICES AND METHODS FOR UNPACKING AN OBJECT MANUFACTURED BY LAYERED APPLICATION

CROSS REFERENCE TO RELATED APPLICATIONS

This application is a continuation of and claims priority under 35 U.S.C. § 120 from PCT Application No. PCT/EP2018/056075 filed on Mar. 12, 2018, which claims priority from German Application No. DE 10 2017 108 080.5, filed on Apr. 13, 2017. The entire contents of each of these priority applications are incorporated herein by reference.

TECHNICAL FIELD

The disclosure relates to devices for unpacking a three-dimensional (3D) object manufactured in a swap container by layer-by-layer application and selective solidification of a powdery structural material, and methods for unpacking a 3D object from a swap container.

BACKGROUND

A processing facility for manufacturing workpieces by subjecting raw material powder layers to electromagnetic radiation is described in DE 20 2013 009 787 U1. The action of electromagnetic radiation on the powder raw material results in solidification of the powder raw material, wherein, adjacently to a developing object, powder raw material that has stayed unsolidified remains in a construction chamber. After completion of a construction process for manufacturing the object, the construction chamber is fed to an exchange station and subsequently to a downstream parking station, and in turn to a rotation station. In the rotation station, the construction chamber is connected to a construction chamber attachment and rotated by 180°. Unused powder raw material falls out of the construction chamber due to gravity. Subsequently, the construction chamber is rotated back and transferred into a removal station. In the removal station, a substrate plate on which the object is constructed, is moved inside the construction chamber by a motor of the removal station, such that the object can be removed.

Furthermore, a facility for manufacturing an object by layered application and selective solidification of a powdery structural material is described in WO 2017/017 273 A1. A swap container, in which a substrate plate including the constructed object is provided, is fed to an unloading station. In this case, the substrate plate is moved out of the swap container and rigidly connected to a swap container attachment. Subsequently, the swap container attachment, including the substrate plate fixed thereon, is rotated about a horizontal axis. Following unloading of non-compacted structural material, the construction chamber attachment is pivoted back, such that the substrate plate can again be retracted into the swap container and the component can be transported further.

A device and a method for layered manufacture of a 3D object and for unpacking the finished object is described in DE 10 2013 223 407 A1. A laser sintering device is used to manufacture a 3D object by applying layer by layer and selectively solidifying a powdery structural material. The device contains an exposure device including a laser, by which the powdery structural material is compacted. The structural material is provided in a swap container. The container includes a substrate plate on which the 3D object is constructed. Following the manufacture of the 3D object, the swap container receives both the manufactured 3D object and the structural material that surrounds the 3D object that has remained unsolidified. To unpack the 3D object, the swap container is displaced, inside the laser sintering device, into an adjacent device for unpacking the 3D object. A rotational movement of the swap container is subsequently performed, about 180° for example, by a rotation device that receives the swap container. The unsolidified structural material is received in a collecting container below the rotation device. Subsequently, the rotation device is rotated back into an upright position and the swap container is moved out again. Thereupon, the substrate plate is removed from the swap container, together with the object. The unpacking process up to removal of the object is time-consuming.

SUMMARY

The disclosure provides devices and methods for process-optimized unpacking of a 3D object manufactured in a swap container by layer-by-layer application and selective solidification of a powdery structural material. Devices for unpacking a 3D object, manufactured in a swap container by layer-by-layer application and selective solidification of a powdery structural material, from the unsolidified structural material surrounding the object, which device include a turning device that rotates the swap container from an upright position into a removal position for discharging the unsolidified structural material, in which the 3D object can be displaced by a drive unit on the turning device into a removal position relative to the swap container, following the unpacking of the unsolidified structural material. The swap container can be inserted into and fixed in the turning device, and the turning device is rotatable about a horizontal axis of rotation. The turning device includes a retaining plate, on which the swap container can be placed. As a result, following unpacking and the transfer of the turning device into the upright position, the object can be immediately removed. It is possible that the object or a substrate plate on which the object is constructed can be removed directly from the swap container. Alternatively, the entire swap container can be removed from the turning device and optionally fed to a further processing station to make the device for unpacking a further manufactured 3D object in a swap container available again for the next unpacking process. Process optimization can be achieved thereby.

A substrate plate carrying the object can be displaced into the removal position relative to the workpiece container using the drive unit and following unpacking of the 3D object. In this case, the substrate plate is displaced at least so far towards an upper edge region of the swap container that either the removal of the object or the removal of the substrate plate carrying the object is made possible in a simple manner. The transfer of the substrate plate into the removal position can occur even in the case of a closed swap container. The displacement movement can begin both in an upright position and in an unloading position, or in an intermediate position of the swap container.

The rotational movement of the turning device from an upright position into an unloading position and back can be performed manually or using an electrically controlled drive. The rotational movement of the turning device can take place out of the upright position into the unloading position, and in the opposite direction back into the upright position again. Alternatively, a rotation of the turning device of 360° about the axis of rotation is also possible.

Furthermore, the turning device (e.g., the retaining plate) can include a clamp, such that the swap container is detachably fixed on the retaining plate. As a result, the swap container holding the manufactured 3D object can be completely removed from a device for layered additive production of components, such as a laser sintering (Selective Laser Sintering, SLS) device or laser melting (Laser Metal Fusion, LMF, or Selective Laser Melting, SLM) device and inserted into a turning device so as to be separate therefrom. As a result, a further swap container for constructing a new 3D object can be inserted in the laser sintering device immediately after removal of one swap container.

A clamping element of the clamp is on the swap container, on a piston that is displaceable in the swap container and to which the substrate plate can be fastened. A complementary clamping element of the clamp is on the driver, such that mutual engagement and bracing of the clamping elements can take place when the swap container is inserted into the turning device when it is positioned on the retaining plate. This establishes a detachable connection between the swap container piston and the driver.

The clamp provided in the turning device includes a bracing mechanism having a capture and orientation pin and a complementary receptacle. As a result, automatic locking of the clamp can take place after the swap container has been placed on the retaining plate. This again allows for process optimization.

In some embodiments, the turning device includes an insertion region or an insertion opening that is opposite at least one contact surface that is oriented towards the retaining plate for the purpose of correctly positioned insertion of the swap container. The insertion and positioning of the swap container into the turning device can be facilitated thereby.

A cover for closing the swap container is provided on the turning device. The cover can rest on the swap container in a media-tight (e.g., gas-tight) manner such that the unsolidified structural material cannot escape. The cover advantageously includes a collecting container having a discharge opening, such that the unsolidified material can firstly collect in the collecting container, in an unloading position of the turning device.

Advantageously, in a removal position of the turning device, the discharge opening on the collecting container of the cover can be positioned with respect to a receiving container. In this case, the unsolidified structural material can fall into the receiving container due to gravity. It is alternatively possible that a suction hose of a suction device can be connected to the discharge opening, such that the unsolidified structural material can be suctioned out and fed to a collection container at least in the unloading position of the turning device.

A fastener such as a quick-release fastener, can be on a wall portion of the turning device or on the cover of the turning device to achieve further process optimization.

The cover can be received on at least one wall portion of the turning device and can be transferred from an open position into the closed position, relative to the swap container. In an open position, the cover can be raised upwards relative to the swap container. Alternatively, the cover can also be pivoted or rotated about a horizontal axis, by a pivot movement, or about a vertical axis, by a rotational movement, into an open position. The cover can be displaceable from the open position into the closed position by a linear guide.

In some embodiments, the drive unit includes a lifting cylinder that is driven pneumatically, electrically, hydraulically or in a similar manner.

Furthermore, an extension movement of the lifting cylinder of the drive unit can be limited by a stop, the position of which can be adjusted. It is thus possible to achieve simple and individual adaptation to different sizes of the swap container. It is furthermore ensured that the piston remains displaceable inside the swap container and is secured against undesired extension out of the swap container.

It is furthermore advantageously possible for the turning device to be driven so as to be rotatable about the longitudinal axis thereof. As a result, a further rotational movement can be superimposed, in addition to the rotational movement about the horizontal axis, with the result that improved unpacking of the unsolidified structural material is made possible. This can be advantageous in the case of hollow structures such as channels, chambers, and/or undercuts that are formed inside a 3D object.

In some embodiments, the cover of the turning device includes a construction volume in which an object can be extended fully out of the swap container and inside the cover, in the case of a closed arrangement of the cover relative to the swap container. The cover includes at least one glove engagement point for manual unpacking. As a result, additional manual follow-up work can be performed in a hermetically sealed space, in the case of objects that are difficult to unpack. Advantageously, a compressed air device is used for unpacking, to blow the remaining powdery structural material out from the manufactured 3D object.

In another aspect, the disclosure provides methods for unpacking a 3D object, manufactured in a swap container by layer-by-layer application and selective solidification of a powdery structural material, from the unsolidified structural material surrounding the object, in which the swap container is inserted into a turning device, the turning device is rotated from an upright position into an unloading position for discharging the unsolidified structural material, and the turning device is transferred into the upright position following unpacking of the manufactured object, where the object is displaced, by a drive unit of the turning device, into a removal position relative to the swap container. The displacement movement into the removal position relative to the swap container can take place during unpacking or during a rotational movement of the turning device from the unloading position into the upright position, or only in the upright position of the turning device following unpacking. Irrespective of the time at which the displacement movement of the 3D object into the removal position relative to the swap container is started, the object can be immediately removed following unpacking. Improved process optimization is thereby achieved.

In some embodiments, after the removal position of the object relative to the swap container has been assumed, a cover closing the swap container is opened and the object or the substrate plate including the object is removed from the swap container, or the swap container is removed from the turning device.

In some embodiments, the swap container is inserted into the turning device and braced by the turning device, the swap container is closed by a cover, the turning device is transferred from the upright position into the unloading position, the unsolidified structural material is extended out of the swap container due to gravity or suctioned out using a suction device, the turning device is returned into the upright position, the object is transferred into the removal position relative to the swap container prior to, during, or after transfer of the turning device into the upright position, and the cover is opened and the object, or the substrate plate including the object, or the swap container, is removed from the turning device. Thereupon, a new process cycle can take place, for unpacking a 3D object manufactured using a swap container, which object is manufactured by layer-by-layer application and selective solidification of a powdery structural material.

The object can be displaced towards or as far as the removal position relative to the swap container, in a position of the turning device that deviates from the upright position. Such a displacement movement of the object towards the removal position relative to the swap container is already actuated at the start of the displacement movement of the swap container out of the upright position and into the removal position. This is advantageous in that a displacement movement of this kind makes it possible for the structural material to be additionally released from and/or discharged from the swap container when the unloading position is assumed, which position is provided for example as an overhead position.

The swap container can be actuatable by a successive and/or at least partially superimposed rotational movement about a first axis of rotation and a second axis of rotation of the turning device, for the purpose of unloading the structural material out of at least one hollow structure of the object. The first axis of rotation can be horizontal for example. The second axis of rotation can be positioned in a longitudinal axis of the swap container for example. As a result, in the case of a hollow structure in the object, which can, for example, correspond to a helical structure, actuation can take place such that the structural material contained in the hollow structure can be gradually conveyed to the outside, from the inner end. The actuation of the rotational movement about the first and second axis can thus be superimposed both in a temporally successive manner and in different time phases. It is also possible for the rotational speeds about the respective axes of rotation to be actuated so as to be the same or so as to deviate from one another and/or so as to be superimposed.

DESCRIPTION OF DRAWINGS

FIG. 3 is a view the unpacking device of FIG. 1, with a swap container with an open cover inserted in a turning device.
FIG. 4 is a view of the unpacking device with a closed turning device in an upright position.

DETAILED DESCRIPTION

Figure 1:
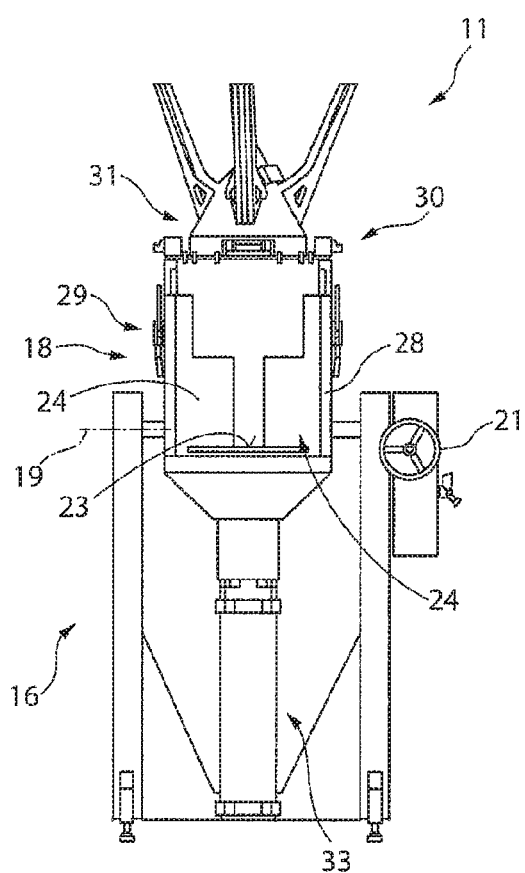
FIG. 1 is a schematic view of an unpacking device.
Figure 2:
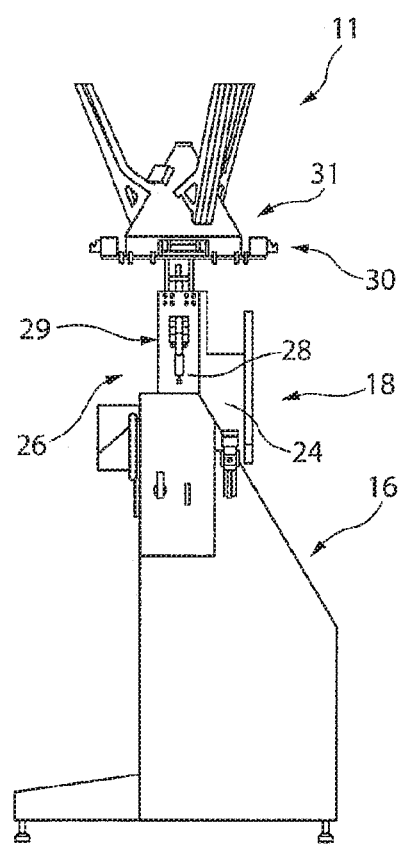
FIG. 2 is a side view of the unpacking device of FIG. 1.

FIGS. 1 and 2 show views of an unpacking device 11. The device 11 is intended for unpacking a 3D object 14 (FIG. 3) that is manufactured in a swap container 12 via layer-by-layer application and selective solidification of a powdery structural material. The structural material that surrounds the completed object 14 remains unsolidified. The 3D object 14 is manufactured in a laser sintering device (not shown in greater detail). The laser sintering device includes an exposure device including a laser that generates a laser beam, where the laser beam is deflected by a deflector and is fed through a focusing device and a coupling window in a wall of a process chamber and focused on a working plane of an uppermost layer of the structural material. Linear displacement of the laser beam allows for layered solidification of the structural material and manufacture of a 3D object. The structural material can be a metal powder or the like. Following manufacture of the 3D object 14, the swap container 12 is removed from the laser sintering device and fed to the device 11 for unpacking the unsolidified structural material.

The device 11 includes a main frame 16 that supports a turning device 18. The turning device 18 is pivotable about an axis of rotation 19 that is oriented horizontally. The pivot movement of the turning device 18 about the axis of rotation 19 can take place manually, for example using the hand wheel 21 shown in FIG. 1. Alternatively, an electrically, pneumatically, or hydraulically actuated drive (not shown in greater detail) can be used for process automation.

The turning device 18 includes a retaining plate 23 on which the swap container 12 can be placed. The turning device 18 furthermore includes at least one contact surface 24 oriented so as to be perpendicular to the retaining plate 23. The at least one contact surface 24 is positioned opposite an insertion region 26 of the turning device 18 and functions as a stop or position fixation device when the swap container 12 is inserted into the turning device 18. The turning device 18 furthermore includes lateral wall portions 28 that form a connection to the axis of rotation 19. The contact surfaces 24 can also adjoin the wall portions 28. A cover 31 is above the wall portions 28. The cover 31 is guided so as to be displaceable relative to the wall portions 28. Rod-like guide elements or linear guides, for example, are provided for this purpose. The cover 31 is shown in an open position in FIGS. 1 and 2.

At least one fastener 29 is on the wall portions 28 of the turning device 18. The fastener is used for fixing the cover 31 in a closed position 32 relative to the swap container 12 (FIG. 4). The at least one fastener 29 can be a quick-release fastener, quick-clamping fastener or the like to allow for simple and quick opening and closure. A linear guide 27, along which the cover 31 is displaceable relative to the wall portions 28, can include return elements such as gas springs or the like, so that the cover 31 can be transferred automatically into the open position 30 of FIG. 1 following opening of the at least one fastener 29.

In a first step for unpacking the 3D object 14 within the swap container 12, the swap container 12 is inserted into the turning device 18. Such an inserted position of the turning container 12 in the turning device 18 is shown in FIG. 3. The swap container 12 is received in the turning device 18 in the correct position by the retaining plate 23 and/or the contact surfaces 24.

The turning device 18 includes a drive unit 33 on a lower face. The drive unit 33 includes a lifting cylinder 34 (FIG. 4). The drive unit 33 is rotatable about the axis of rotation 19, together with the turning device 18.

A clamp 36 can be between the swap container 12 and the drive unit 33. A clamp 36 of this kind is shown schematically in FIG. 4. The clamp 36 includes a first clamping element 37 that is can be on a lower face of a piston 38 of the swap container 12 or integrated in a piston 38 of the swap container 12. A second clamping element 39 is opposite the lifting cylinder 34. One of the two clamping elements 37, 39 includes a capture and/or orientation pin 41, and the other clamping element 39, 37 includes a complementary receptacle 42. In another arrangement of the clamping elements 37, 39, the elements are oriented relative to one another and engage automatically with one another. As a result, the piston 38 is fixed to the lifting cylinder 34.

A substrate plate 44 on which the 3D object 14 is constructed is located on the piston 38 of the swap container 12 so as to be replaceable. The first layer of the 3D object 14 is directly connected to the substrate plate 44. The further layers are built up on the first layer to form the object 14.

Following insertion of the swap container 12 into the turning device 18, the cover 31 is transferred into a closed position 32 (FIG. 4). The at least one fastener 29 is closed. Thereupon, the turning device 18 is transferred from the upright position 47 of FIG. 4 into an unloading position 48, shown in FIG. 5, by a rotational movement about the axis of rotation 19. In this case, the turning device 18 can perform a pivot movement of about 180°. In the unloading position 48 or overhead position, the unsolidified structural material can fall into a collecting container 51 on the cover 31. A discharge opening 52 is at the other end of the collecting container 51. The opening can be connected to a collecting container that is located therebelow and is not shown in greater detail. A suction hose 54 can also be connected to the discharge opening 52, via which the compacted structural material can be suctioned out by a suction device 55 and fed to a reservoir. Before the suctioned structural material is fed to the reservoir, the material can also be filtered or sieved to eliminate impurities. As a result, the unsolidified structural material can be used again for a subsequent manufacturing process.

In the unloading position, the cover 31 can also sometimes be opened. This is advantageous, for example, if manual cleaning is intended to be performed in this position.

Figures 5, 6:
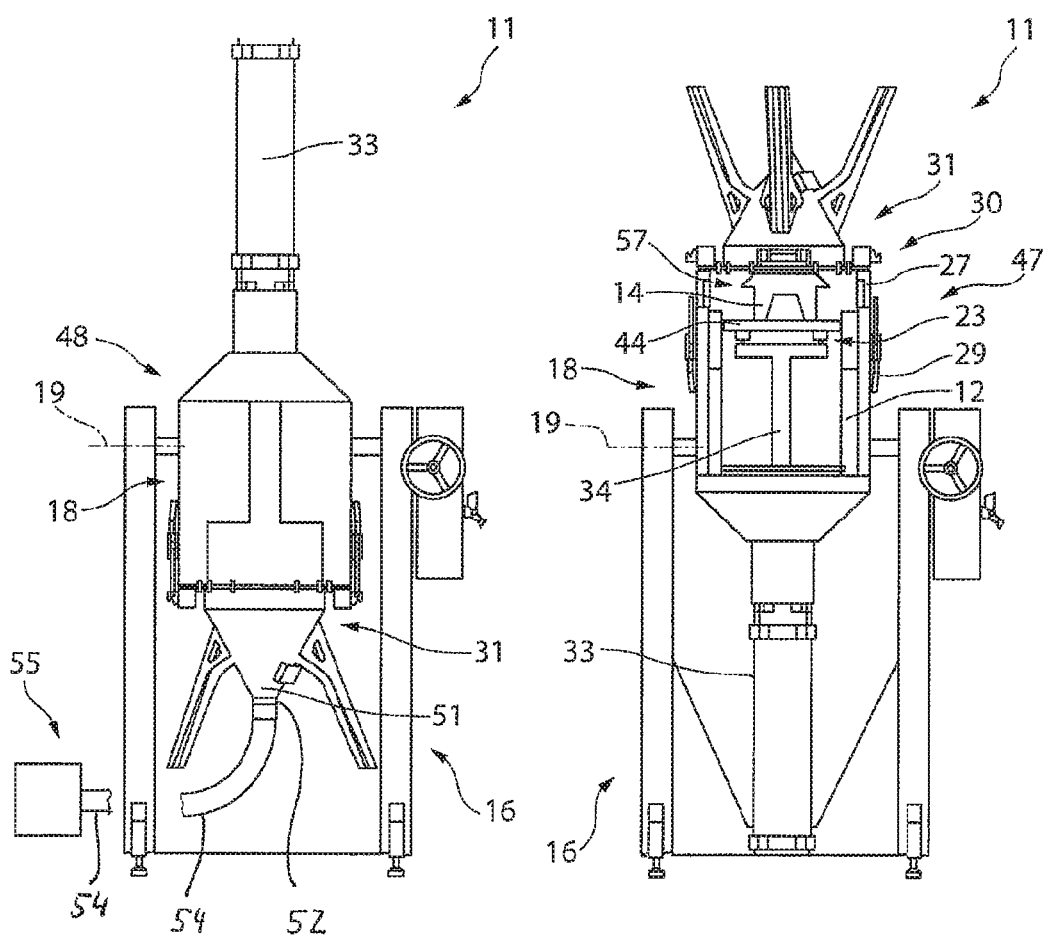
FIG. 5 is a view of the unpacking device with a turning device in an unloading position.
FIG. 6 is a side view the device of FIG. 1 in an upright position with an open cover, following unpacking.

Following unpacking of the 3D object 14, the turning device 18 is transferred into the upright position 47 again, as is shown in FIG. 6. In this case, a rotation of the turning device 18 can take place in the opposite direction of rotation compared with the transfer from the upright position 47 into the unloading position 48. The direction of rotation can also be maintained, with the result that the turning device is rotated fully, by 360°.

While in the upright position 47, the 3D object 14 is transferred, by the drive unit 33, into a removal position 57 with respect to the swap container 12. The lifting cylinder 34 is extended to place the 3D object 14 in the removal position 57. The actuation of the displacement movement of the lifting cylinder 34 can already begin in the unloading position 48 of the turning device 12. The actuation of the displacement movement of the lifting cylinder 34 can take place prior to opening the cover 31, in the upright position 47 of the turning device 12. In the embodiment of FIG. 6, the turning device 18 is transferred into the upright position 47 and the at least one fastener 29 is opened, such that the cover 31 is in a raised position relative to the swap container 12. Thereupon, the lifting cylinder 34 displaces the 3D object 14 to the removal position 47. Subsequently, the substrate plate 44 is removed from the swap container 12, together with the object 14. Alternatively, it is also possible for the entire swap container 12 to be removed from the turning device 18. Likewise, it is also possible for only the object 14 to be removed.

The cover 31 includes a frame (e.g., a tripod) on the outside thereof. A frame of this kind can be used for allowing the cover 31 to assume an independent standing position, for example when the cover is connected to the swap container 12 so as to be completely detachable. It can furthermore be possible for the swap container 12 to be able to be placed into an unloading position 48, if the turning out of an upright position 47 into an unloading position 48, and subsequent suction, is separated. Moreover, the cover 31 can also be securely positioned on the frame together with an attached suction element such as a suction hose.

Figure 7:
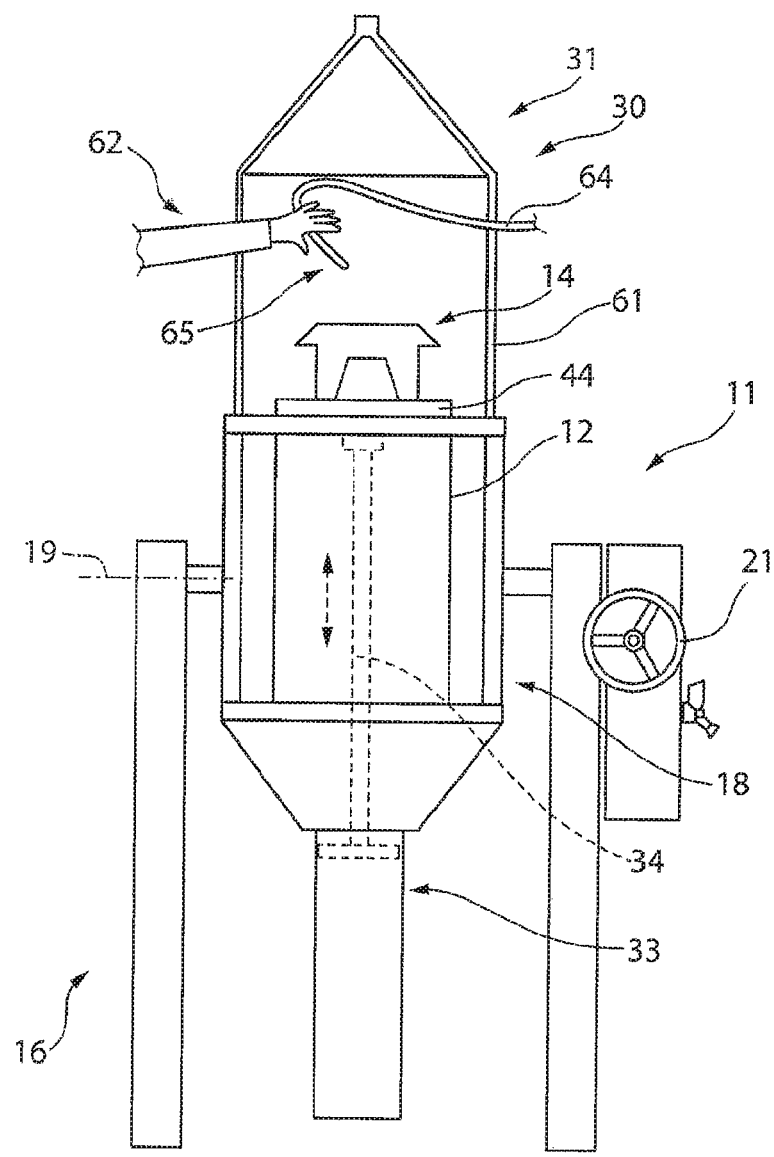
FIG. 7 is a view of an alternative embodiment of the device.

FIG. 7 shows an alternative embodiment of the device 11 compared with that of FIGS. 1 and 2. The embodiment of FIG. 7 deviates from the above-described embodiment of the turning device 18 in that the cover 31 includes a closed wall portion 61. The wall portion 61 is cylindrical and corresponds to the height of the swap container 12 or approximately to the height of the swap container 12. This makes it possible for the 3D object 14 to be in the removal position 57 relative to the swap container 12 when the cover 31 is closed, and for manual unpacking of the unsolidified structural material using at least one glove engagement point 62. Compressed air is supplied by a compressed-air hose 64 of a compressed-air gun, such that the object 14 can be blown out. Alternatively, a siphon 65 can be used for manually suctioning residual structural material. It is furthermore possible for a removal opening to be in the wall portion 61. Alternatively, a linear guide 27 can raise the cover 31 relative to the swap container 12 such that the container can also be removed from the turning device 18, together with the object 14, in the removal position 57. Variants of the device 11 of FIGS. 1 to 6 also apply for the device 11 shown in FIG. 7.

It is alternatively possible for the turning device 18 to be driven so as to be rotatable about the longitudinal axis thereof, in addition to the actuatable rotational movement about the axis of rotation 19, which is horizontal. This allows for further removal of unsolidified structural material in all spatial directions, optimized to the object's contours.

A vibration device and/or knocking device can act on the swap container 12 or the substrate plate 44. Alternatively or in addition, it is also possible for a vibration device and/or knocking device to act directly on the object 14, for example if the device is inside the cover 31. As a result, the removal of the unsolidified structural material can be further promoted.

Alternatively, the opening and closing movement of the cover 31 relative to the swap container 12 can also be actuated by a drive. This can be in the case of incorporation into process automation.

The device 11 thus allows for quick unpacking, as well as hermetically sealed unpacking of the unsolidified structural material. The device 11 can also be incorporated in an automated process. Furthermore, structural material that is still hot can also be unpacked, as a result of which process optimization is also made possible.

Other Embodiments

A number of embodiments of the invention have been described. Nevertheless, it will be understood that various modifications can be made without departing from the spirit and scope of the invention. Accordingly, other embodiments are within the scope of the following claims.

What is claimed is:
1. A device for unpacking a three-dimensional object that has been manufactured by layer-by-layer application and selective solidification of a powdery structural material from structural material that surrounds the object that has remained unsolidified, comprising:
 a turning device configured to rotate a swap container containing the three-dimensional object about a hori- zontal axis of rotation from an upright position to an unloading position, wherein the swap container is insertable and fixable to the turning device, wherein the turning device comprises a retaining plate on which the swap container can be placed;

a drive unit by which the three-dimensional object can be placed in a removal position relative to the swap container, wherein the drive unit is rotatable, together with the turning device, about the axis of rotation; and a clamp by which the swap container is detachably fixed to the retaining plate.

2. The device of claim 1, comprising a substrate plate carrying the three-dimensional object that is movable to the removal position with respect to the swap container by the driver.

3. The device of claim 1, wherein the clamp comprises a first clamping element on the swap container, and a second clamping element on the driver, wherein the clamping elements are configured to engage and detachably brace one another when the swap container is inserted into the turning device.

4. The device of claim 3, wherein the clamp comprises a bracing mechanism in which the first clamping element comprises a capture and orientation pin, and the second clamping element comprises a complementary receptacle, or vice versa.

5. The device of claim 1, wherein the turning device comprises an insertion region or an insertion opening opposite at least one contact surface that is oriented towards the retaining plate that ensures the swap container is correctly positioned when inserted into the turning device.

6. The device of claim 1, wherein the turning device comprises a cover for closing the swap container, the cover comprising a collecting container having a discharge opening.

7. The device of claim 6, wherein in the unloading position of the turning device, the discharge opening of the collecting container is configured to receive the unsolidified structural material, or a suction hose of a suction device is connectable to the discharge opening to remove the unsolidified structural material.

8. The device of claim 6, wherein the cover or a wall portion of the turning device comprises at least one quick-clamping fastener by which the cover can be braced by the swap container while in a closed position.

9. The device of claim 6, wherein the cover is received on at least one wall portion of the turning device and is transferrable from an open position into a closed position.

10. The device of claim 6, wherein the cover comprises a construction volume in which a three-dimensionally manufactured object is arrangeable in a removal position relative to the swap container.

11. The device of claim 1, wherein the drive unit is a lifting cylinder that is driven pneumatically, hydraulically or electrically.

12. The device of claim 11, wherein the drive unit comprises an adjustable stop that limits an extension movement of the lifting cylinder.

13. The device of claim 1, wherein the turning device is driven so as to be rotatable about a longitudinal axis thereof.

14. The device of claim 1, wherein the swap container comprises at least one glove engagement point for manual unpacking using a compressed air device.

* * * * *